US008031178B2

(12) United States Patent  
Rak et al.

(10) Patent No.: US 8,031,178 B2  
(45) Date of Patent: Oct. 4, 2011

(54) KEYBOARD WITH CHASSIS STRUCTURE

(75) Inventors: Roman Peter Rak, Waterloo (CA); John A. Holmes, Waterloo (CA); Jason T. Griffin, Waterloo (CA)

(73) Assignee: Research In Motion Limited, Waterloo, Ontario ( * ) Notice: Subject to any disclaimer, the term of this patent is extended or adjusted under 35 U.S.C. 154(b) by 841 days.

(21) Appl. No.: 10/896,554

(22) Filed: Jul. 22, 2004

(65) Prior Publication Data

US 2006/0017697 A1    Jan. 26, 2006

(51) Int. Cl.
  *G06F 3/02*     (2006.01)
  *H04M 9/00*    (2006.01)
(52) U.S. Cl. .................. 345/168; 379/433.07
(58) Field of Classification Search .................. 345/168, 345/169; 379/433.07
  See application file for complete search history.

(56) References Cited

U.S. PATENT DOCUMENTS

| | | | |
|---|---|---|---|
| 1,336,151 A | 4/1920 | O'Connor | |
| 1,652,464 A | 12/1927 | Tyberg | |
| 2,532,228 A | 11/1950 | Hesh | |
| 4,256,931 A | 3/1981 | Palisek | |
| 4,449,839 A | 5/1984 | Bleuer | |
| 4,476,355 A * | 10/1984 | Mital | 200/5 A |
| 4,769,516 A | 9/1988 | Allen | |
| 4,783,645 A | 11/1988 | Goldwasser et al. | |
| D313,413 S | 1/1991 | Langton | |
| 5,017,030 A | 5/1991 | Crews | |
| 5,115,108 A | 5/1992 | Ogawa et al. | |
| 5,156,475 A | 10/1992 | Zilberman | |
| 5,294,121 A * | 3/1994 | Chiang | 273/148 B |
| 5,336,001 A | 8/1994 | Lichtenberg | |
| 5,360,280 A | 11/1994 | Camacho et al. | |
| 5,367,298 A | 11/1994 | Axthelm | |
| 5,486,058 A | 1/1996 | Allen | |
| 5,500,653 A | 3/1996 | Kamihata | |
| 5,503,484 A | 4/1996 | Louis | |
| 5,528,235 A | 6/1996 | Lin et al. | |
| 5,541,622 A * | 7/1996 | Engle et al. | 345/161 |
| 5,660,488 A | 8/1997 | Miller | |
| D383,756 S | 9/1997 | Henderson et al. | |
| 5,794,762 A | 8/1998 | Tsai | |
| 5,841,374 A | 11/1998 | Abraham | |
| 5,861,823 A | 1/1999 | Strauch et al. | |
| 5,902,972 A | 5/1999 | Nestor et al. | |
| 5,973,671 A | 10/1999 | Kuo | |
| D416,256 S | 11/1999 | Griffin et al. | |
| 6,157,323 A * | 12/2000 | Tso et al. | 341/22 |
| 6,219,694 B1 | 4/2001 | Lazaridis et al. | |

(Continued)

FOREIGN PATENT DOCUMENTS

JP       2002-055758       2/2002

(Continued)

*Primary Examiner* — Amr Awad  
*Assistant Examiner* — Randal Willis  
(74) *Attorney, Agent, or Firm* — Novak Druce + Quigg, LLP

(57) ABSTRACT

A keyboard apparatus includes a group of switches, a key having a corresponding group of plungers, and a chassis structure including a panel and a post. The post projects upward from the panel to support the key for manual movement pivotally into multiple actuated positions in which the plungers actuate the switches. The panel has a group of apertures through which the plungers are movable into actuating engagement with the switches upon such multi-directional movement of the key.

20 Claims, 7 Drawing Sheets

U.S. PATENT DOCUMENTS

| | | | |
|---|---|---|---|
| 6,230,222 B1 | 5/2001 | Rush | |
| 6,278,442 B1 | 8/2001 | Griffin et al. | |
| 6,307,537 B1 * | 10/2001 | Oowada | 345/160 |
| 6,310,609 B1 | 10/2001 | Morgenthaler | |
| D451,079 S | 11/2001 | Ali | |
| 6,335,496 B1 * | 1/2002 | Miyashita | 200/5 R |
| 6,359,838 B1 | 3/2002 | Taylor | |
| 8,377,685 | 4/2002 | Krishnan | |
| 6,409,600 B1 | 6/2002 | Sobota et al. | |
| 6,441,753 B1 * | 8/2002 | Montgomery | 341/34 |
| 6,452,588 B2 | 9/2002 | Griffin et al. | |
| 6,489,950 B1 | 12/2002 | Griffin et al. | |
| D470,150 S | 2/2003 | Lewis, Jr. et al. | |
| D472,225 S | 3/2003 | Griffin | |
| 2001/0006587 A1 * | 7/2001 | Keinonen et al. | 400/472 |
| 2002/0110237 A1 * | 8/2002 | Krishnan | 379/419 |
| 2002/0175057 A1 | 11/2002 | Swanson | |
| 2003/0095107 A1 | 5/2003 | Griffin et al. | |
| 2005/0168447 A1 * | 8/2005 | Caine et al. | 345/169 |
| 2005/0184963 A1 * | 8/2005 | Fyke | 345/168 |
| 2006/0262095 A1 * | 11/2006 | Ladouceur et al. | 345/168 |

FOREIGN PATENT DOCUMENTS

| | | |
|---|---|---|
| JP | 2004-021745 | 1/2004 |
| WO | WO 03/063005 | 7/2003 |
| WO | WO 03/090008 | 10/2003 |

* cited by examiner

KEYBOARD WITH CHASSIS STRUCTURE

TECHNICAL FIELD

This technology relates generally to the field of input systems for electronic devices, and particularly to a keyboard that is especially well-suited for use in a hand-held mobile communication device.

BACKGROUND

Hand-held mobile communication devices may include a combined text-entry and telephony keyboard. Examples of such mobile devices include cellular telephones, wireless personal digital assistants (PDAs), two-way paging devices, and others. The keyboard can be actuated with the fingers of one or both of the user's hands.

SUMMARY

A keyboard apparatus comprises a group of switches, a key having a corresponding group of plungers, and a chassis structure including a panel and a post. The post projects upward from the panel to support the key for manual movement pivotally into multiple actuated positions in which the plungers actuate the switches. The panel has a group of apertures through which the plungers are movable into actuating engagement with the switches upon such multi-directional movement of the key.

DETAILED DESCRIPTION

Figure 1:
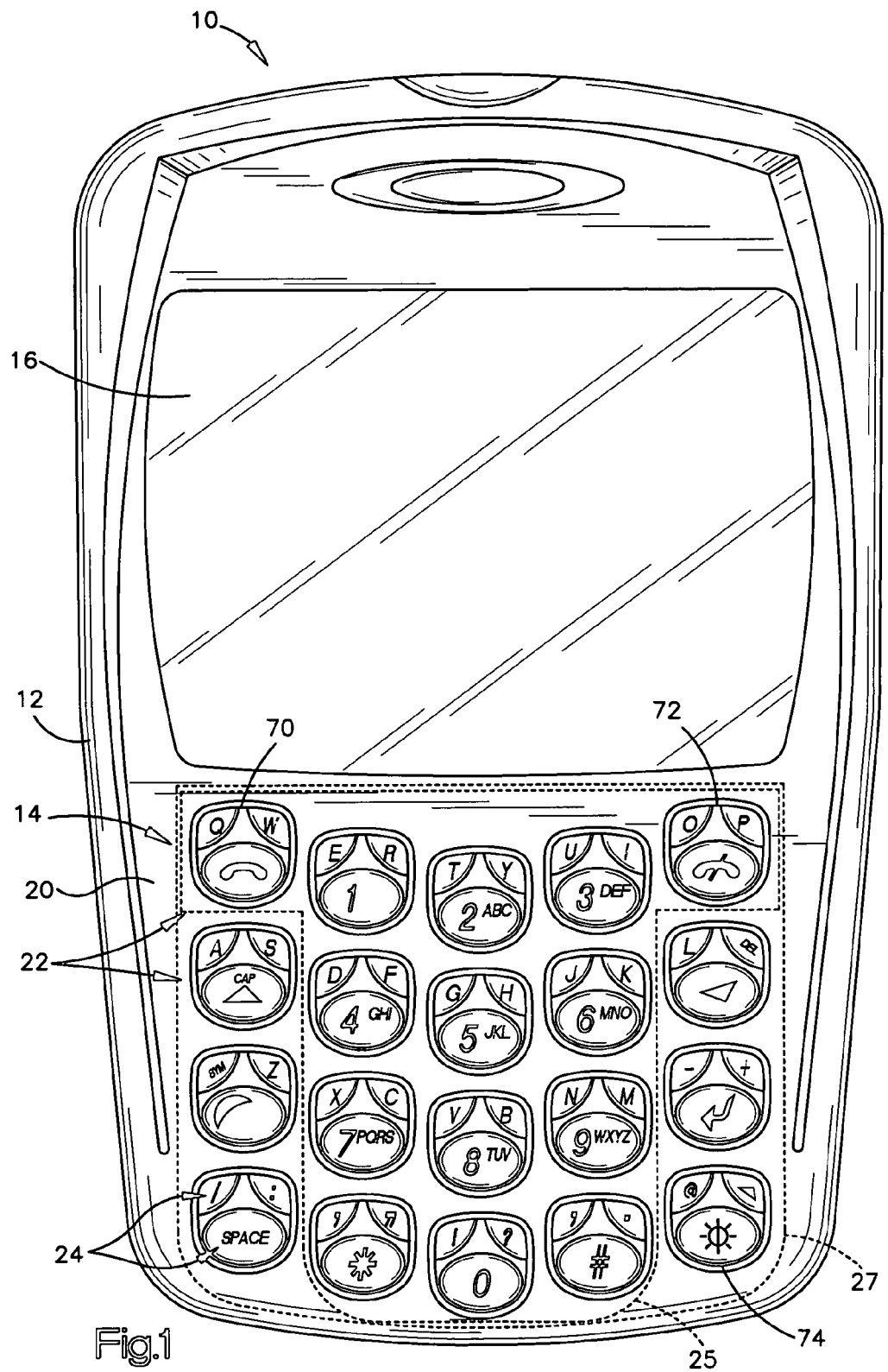
FIG. 1 is a front view of a mobile device with a keyboard.
Figure 2:
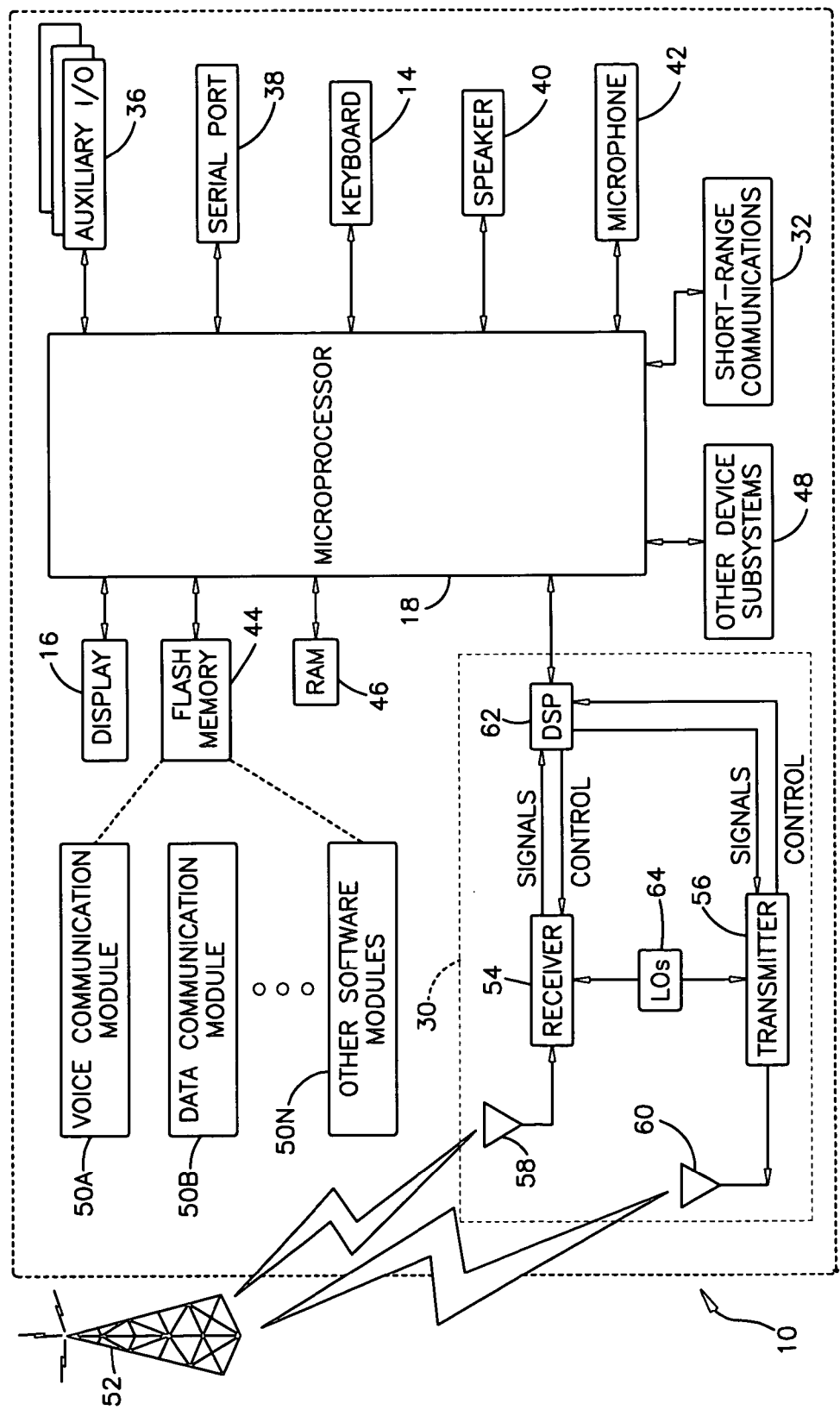
FIG. 2 is a block diagram schematically showing parts of the device of FIG. 1.

The apparatus 10 shown in FIG. 1 has parts that are examples of the elements recited in the claims. This apparatus 10 is a hand-held mobile communication device including a housing 12, a keyboard 14 and an output device 16. As shown in FIG. 1, this example of an output device is a display 16, which is preferably a full graphic LCD. A processing device 18, which is shown schematically in FIG. 2, is contained within the housing 12. The processing device 18 controls the operation of the display 16, as well as the overall operation of the mobile device 10, in response to actuation of the keyboard 14 by the user.

This example of a keyboard 14 is defined in part by a front panel 20 of the housing 12, and in part by a plurality of acutatable keys 22 at the panel 20. The keys 22 and their corresponding actuation indicia 24 together define a telephone keypad 25 and an overlapping text-entry keyboard 27. The keyboard 14 as a whole is thus configured for operation of the mobile device 10 in a telephony mode, in a text-entry mode, or in both the telephony mode and the text-entry mode.

Operation

The mobile device 10 is operative as indicated schematically in FIG. 2. In addition to the processing device 18, other parts of the mobile device 10 also are shown schematically in FIG. 2. These include a communications subsystem 30; a short-range communications subsystem 32; the keyboard 14 and the display 16, along with other input/output devices 36, 38, 40 and 42; as well as memory devices 44, 46 and various other device subsystems 48. The mobile device 10 is preferably a two-way communication device having voice and data communication capabilities and preferably has the capability to communicate with other computer systems via the Internet.

Operating system software executed by the processing device 18 is preferably stored in a persistent store, such as a flash memory 44, but may be stored in other types of memory devices, such as a read only memory (ROM) or similar storage element. In addition, system software, specific device applications, or parts thereof, may be temporarily loaded into a volatile store, such as a random access memory (RAM) 46. Communication signals received by the mobile device 10 also may be stored to the RAM 46.

The processing device 18, in addition to its operating system functions, enables execution of software applications 50A-50N on the device 10. A predetermined set of applications that control basic device operations, such as data and voice communications 50A and 50B, may be installed on the device 10 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 52. Preferably, the PIM data items are seamlessly integrated, synchronized and updated via the wireless network 52 with the device user's corresponding data items stored or associated with a host computer system. An example system and method for accomplishing these steps is disclosed in "System And Method For Pushing Information From A Host System To A Mobile Device Having A Shared Electronic Address," U.S. Pat. No. 6,219,694, which is owned by the assignee of the present application, and which is incorporated herein by reference.

Communication functions, including data and voice communications, are performed through the communication subsystem 30, and possibly through the short-range communications subsystem 32. The communication subsystem 30 includes a receiver 54, a transmitter 56, and one or more antennas 58 and 60. In addition, the communication subsystem 30 also includes a processing module, such as a digital signal processor (DSP) 62, and local oscillators (LOs) 64. The specific design and implementation of the communication subsystem 30 is dependent upon the communication network in which the mobile device 10 is intended to operate. For example, the mobile device 10 may include a communication subsystem 30 designed to operate with the Mobitex™, Data TAC™ or General Packet Radio Service (GPRS) mobile data communication networks and also designed to operate with any of a variety of voice communication networks, such as AMPS, TDMA, CDMA, PCS, GSM, etc. Other types of data and voice networks, both separate and integrated, may also be utilized with the mobile device 10.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile device 10 may send and receive communication signals over the communication network 52. Signals received from the communication network 52 by the antenna 58 are routed to the receiver 54, which provides for signal amplification, frequency down conversion, filtering, channel selection, etc., and may also provide analog to digital conversion. Analog-to-digital conversion of the received signal allows the DSP 62 to perform more complex communication functions, such as demodulation and decoding. In a similar manner, signals to be transmitted to the network 52 are processed (e.g. modulated and encoded) by the DSP 62 and are then provided to the transmitter 56 for digital to analog conversion, frequency up conversion, filtering, amplification and transmission to the communication network 52 (or networks) via the antenna 58.

In addition to processing communication signals, the DSP 62 provides for control of the receiver 54 and the transmitter 56. For example, gains applied to communication signals in the receiver 54 and transmitter 56 may be adaptively controlled through automatic gain control algorithms implemented in the DSP 62.

In a data communication mode, a received signal, such as a text message or web page download, is processed by the communication subsystem 30 and is input to the processing device 18. The received signal is then further processed by the processing device 18 for an output to the display 16, or alternatively to some other auxiliary I/O device 36. A device user may also compose data items, such as e-mail messages, using the keyboard 14 and/or some other auxiliary I/O device 36, such as a touchpad, a rocker switch, a thumb-wheel, or some other type of input device. The composed data items may then be transmitted over the communication network 52 via the communication subsystem 30.

In a voice communication mode, overall operation of the device is substantially similar to the data communication mode, except that received signals are output to a speaker 40, and signals for transmission are generated by a microphone 42. Alternative voice or audio I/O subsystems, such as a voice message recording subsystem, may also be implemented on the device 10. In addition, the display 16 may also be utilized in voice communication mode, for example to display the identity of a calling party, the duration of a voice call, or other voice call related information.

The short-range communications subsystem 32 enables communication between the mobile device 10 and other proximate systems or devices, which need not necessarily be similar devices. For example, the short-range communications subsystem 32 may include an infrared device and associated circuits and components, or a Bluetooth™ communication module to provide for communication with similarly-enabled systems and devices.

The mobile device 10 may also include a predictive text computer program that is used in conjunction with the keyboard 14. A predictive text computer program may, for example, be used to predict a complete word or phrase from one or more keystrokes. If the predictive text computer program does not successfully predict a desired word or phrase, then text-entry characters may be entered more completely, albeit more slowly, by selecting the appropriate characters on the keys 22.

Keyboard Structure

As noted above, the keyboard 14 includes a telephone keypad 25 and an overlapping text-entry keyboard 27. The actuation indicia 24 is preferably located on the keys, as shown in the example of FIG. 1. In this particular example, the keys 22 and their corresponding actuation indicia 24 together define an entire telephone keypad 25 with functional keys and numeral keys 1-9 and 0, and further define an entire QWERTY keyboard 27 with functional keys and letter keys A-Z. Each key 22 is configured for multi-directional movement pivotally into and out of multiple actuated positions that correspond to characters in the telephone keypad 25 and/or the overlapping QWERTY keyboard 27. This presents the user of the device 10 with a compact arrangement of multi-purpose telephone and text-entry keys 22.

More specifically, each key 22 in the example shown in FIG. 1 has three different actuated positions. The key 70 at the upper left-hand corner of the telephone keypad 25 thus has an actuated position to "pick up," and further has two additional actuated positions for text entry of the letters Q and W, respectively, in the overlapping QWERTY keyboard 27. The key 72 at the upper right-hand corner of the telephone keypad 25 similarly has an actuated position to "hang up," along with two additional actuated positions for text entry of the letters O and P, respectively, in the overlapping QWERTY keyboard 27.

Other keys in the telephone keypad 25 include a group of keys for telephone numerals 1-9. Each of those keys 22 has an actuated position for the respective telephone numeral, and further has two more actuated positions for respective letters in the QWERTY keyboard 27. Within that group of telephone keys 22 is a smaller group for telephone numerals 2-9. The actuated position for the telephone numeral at each of those keys 22 further serves as a common actuated position for all of the telephone keypad letters that correspond to the respective numeral. For example, the actuated position for the telephone numeral 9 is the same as the actuated position for each of the telephone keypad letters W, X, Y and Z. The key 22 for the telephone numeral 0, as well as each of the adjacent keys for the telephone functions "*" and "#," likewise has a single actuated position for its telephone keypad character, and further has a pair of additional actuated positions for a respective pair of text-entry functions.

The remaining text-entry letters and functional characters that complete the entire QWERTY keyboard 27 are provided on six additional keys 22 that do not overlap the telephone keypad 25. As shown in FIG. 1, the six non-overlapping keys 22 appear in columns directly beneath the "pick up" and "hang up" keys 70 and 72. With the exception of the key 74 at the lower right, which has a power on/off position, the actuated positions of the six non-overlapping keys 22 all correspond to text entry letters and functions.

Figure 3:
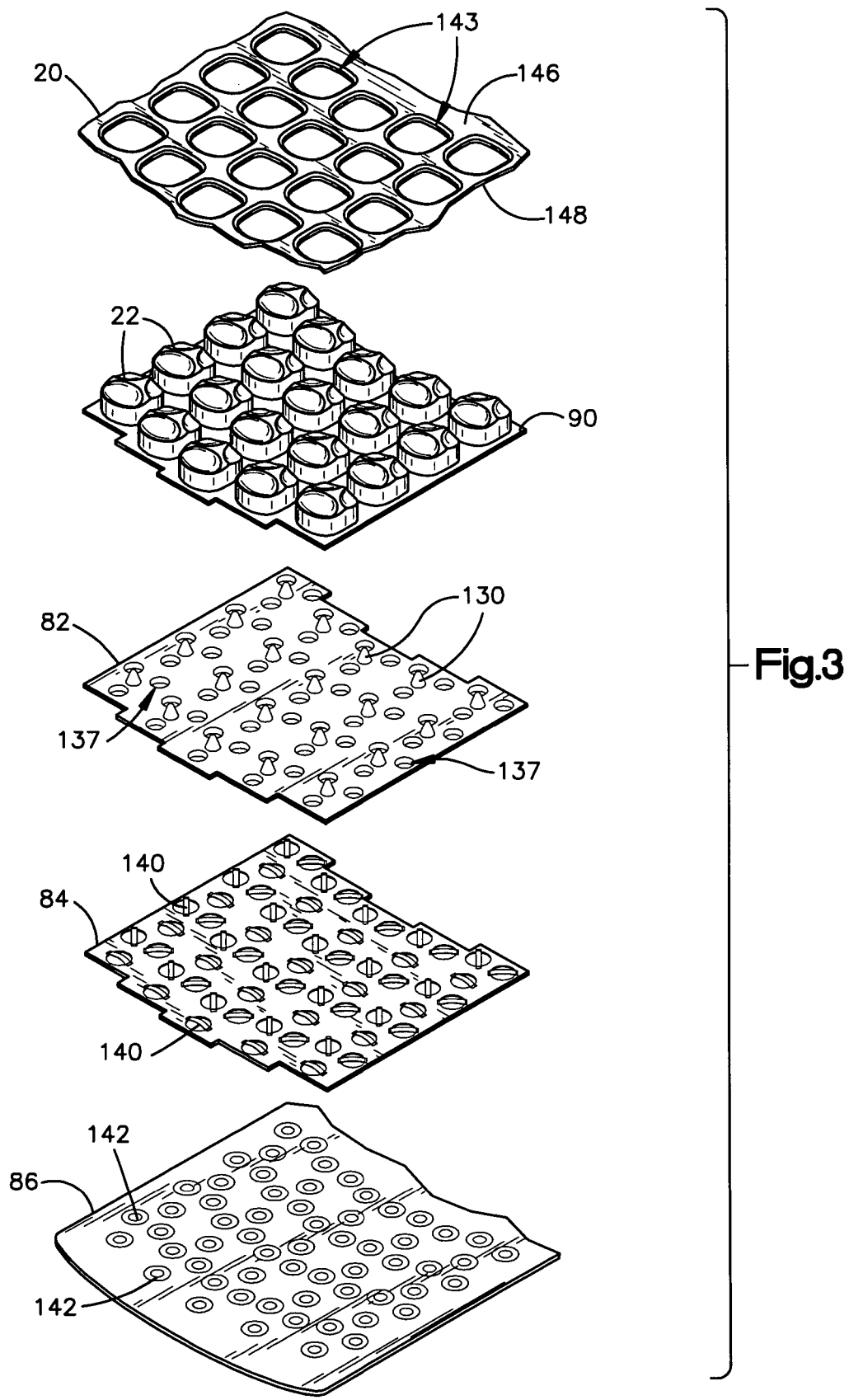
FIG. 3 is an exploded view of parts of the device of FIG. 1.
Figure 4:
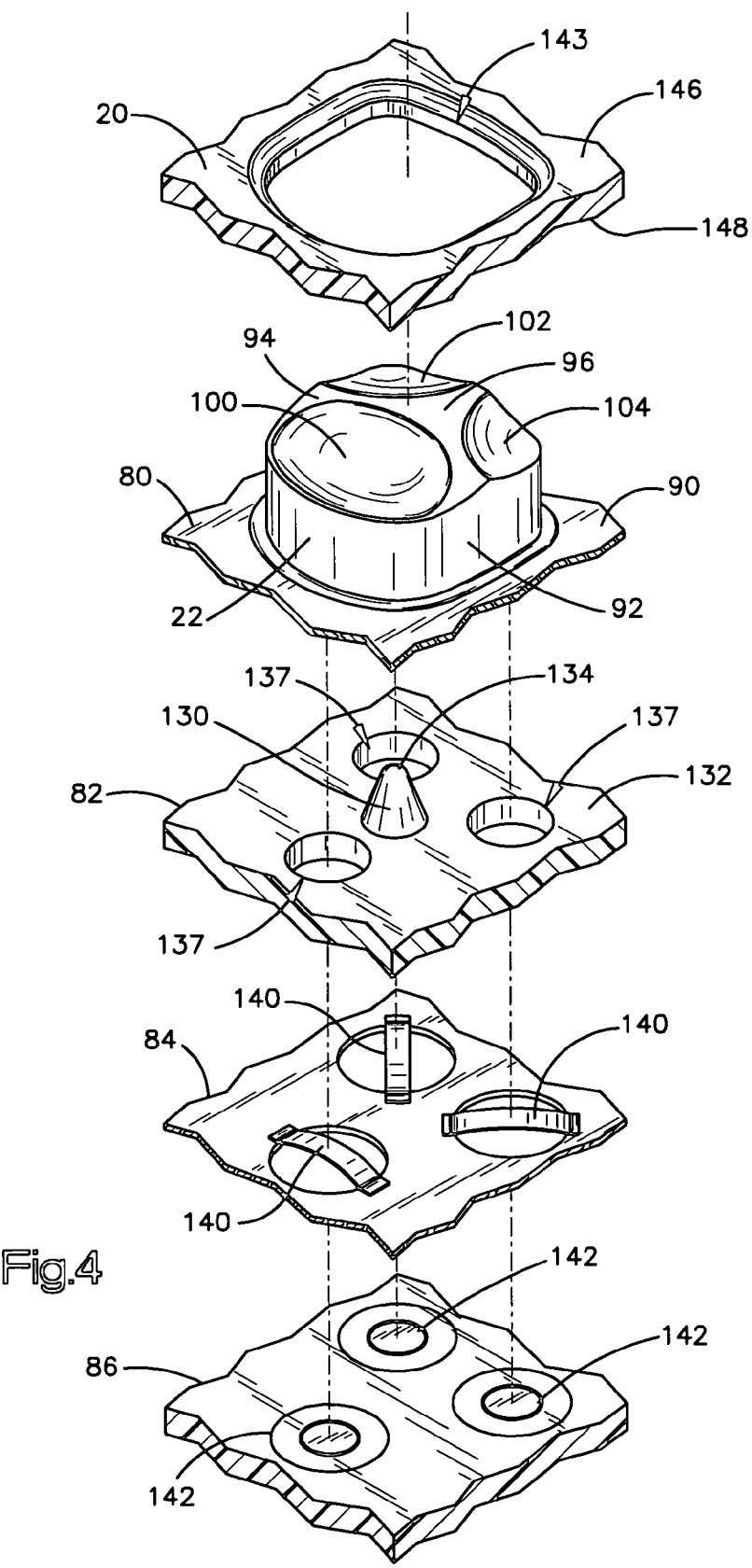
FIG. 4 is an exploded view showing enlarged portions of the parts shown in FIG. 3.

The internal structure of the keyboard 14 is illustrated in FIG. 3. This includes a molded plastic sheet 80 that defines the keys 22, an underlying chassis 82 that supports the keys 22, and a dome actuator panel 84 beneath the chassis 82. The dome actuator panel 84 overlies a printed circuit board (PCB) 86.

The keys 22 are formed as raised portions of the molded plastic sheet 80 that project upward from a thin planar base portion 90. Every key 22 has the same size and shape. Each key 22 on the sheet 80 thus has the configuration of the individual key 22 that is shown in enlarged detail in FIGS. 4-8.

Figure 6:
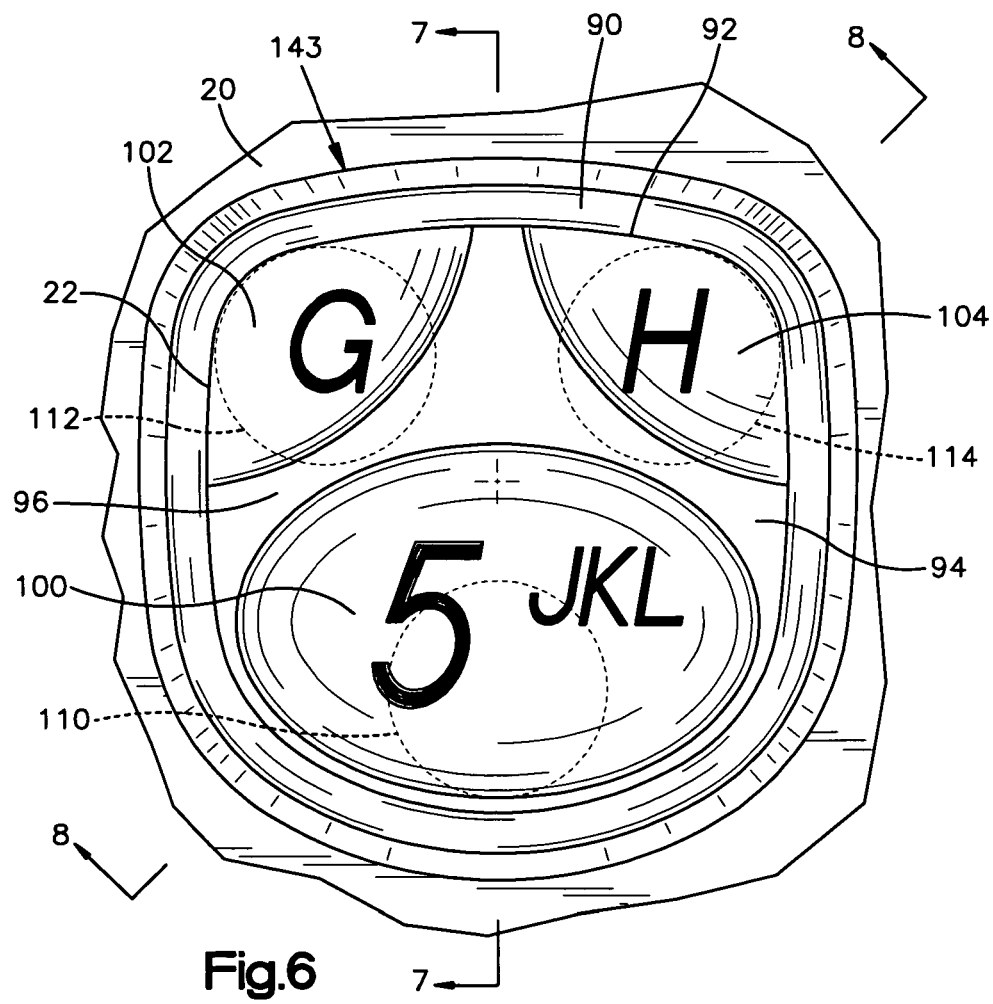
FIG. 6 is an enlarged front view of parts shown in FIG. 1.

A side wall 92 of the key 22 projects vertically from the base portion 90 of the plastic sheet 80. The side wall 92 provides the key 22 with a generally rectangular peripheral shape with rounded corners, as best shown in FIG. 6. A top wall 94 of the key 22 has an actuation surface 96 upon which the actuation indicia 24 (FIG. 1) appears. The contour of the actuation surface 96 defines distinct surface portions that correspond to the actuated positions of the key 22. In this example, the actuation surface 96 is recessed from an otherwise dome-shaped contour at a plurality of distinct concave scalloped portions. These include a single major portion 100 and two minor portions 102 and 104. The major portion 100 has an oval peripheral shape, and the two minor portions each have a segmental oval peripheral shape. These three recessed portions 100, 102 and 104 of the dome-shaped actuation surface 96 are separated from each other by the three generally distinct branches of the non-recessed portion that is shown fully in the front view of FIG. 6.

Depending on the location of the key 22 in the telephone keypad 25 and/or the overlapping text entry keyboard 27, the major actuation surface portion 100 of the key will correspond to the actuated position for one or more telephone keypad characters or, alternatively, a text entry keyboard character. The minor actuation surface portions 102 and 104 correspond to the actuated positions for two respective text entry characters. This is indicated by example in FIG. 6.

Figure 5:
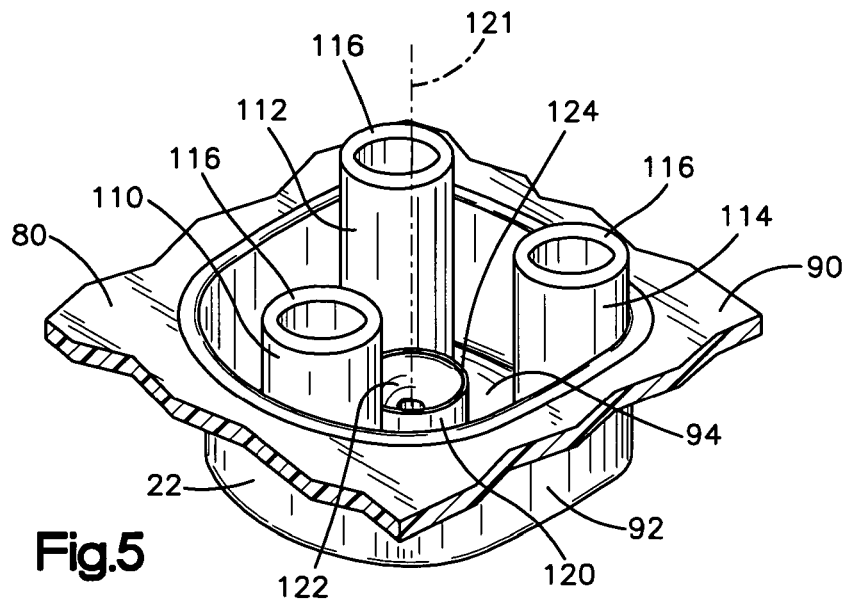
FIG. 5 is an inverted view of a part shown in an upright position in FIG. 4.
Figure 7:
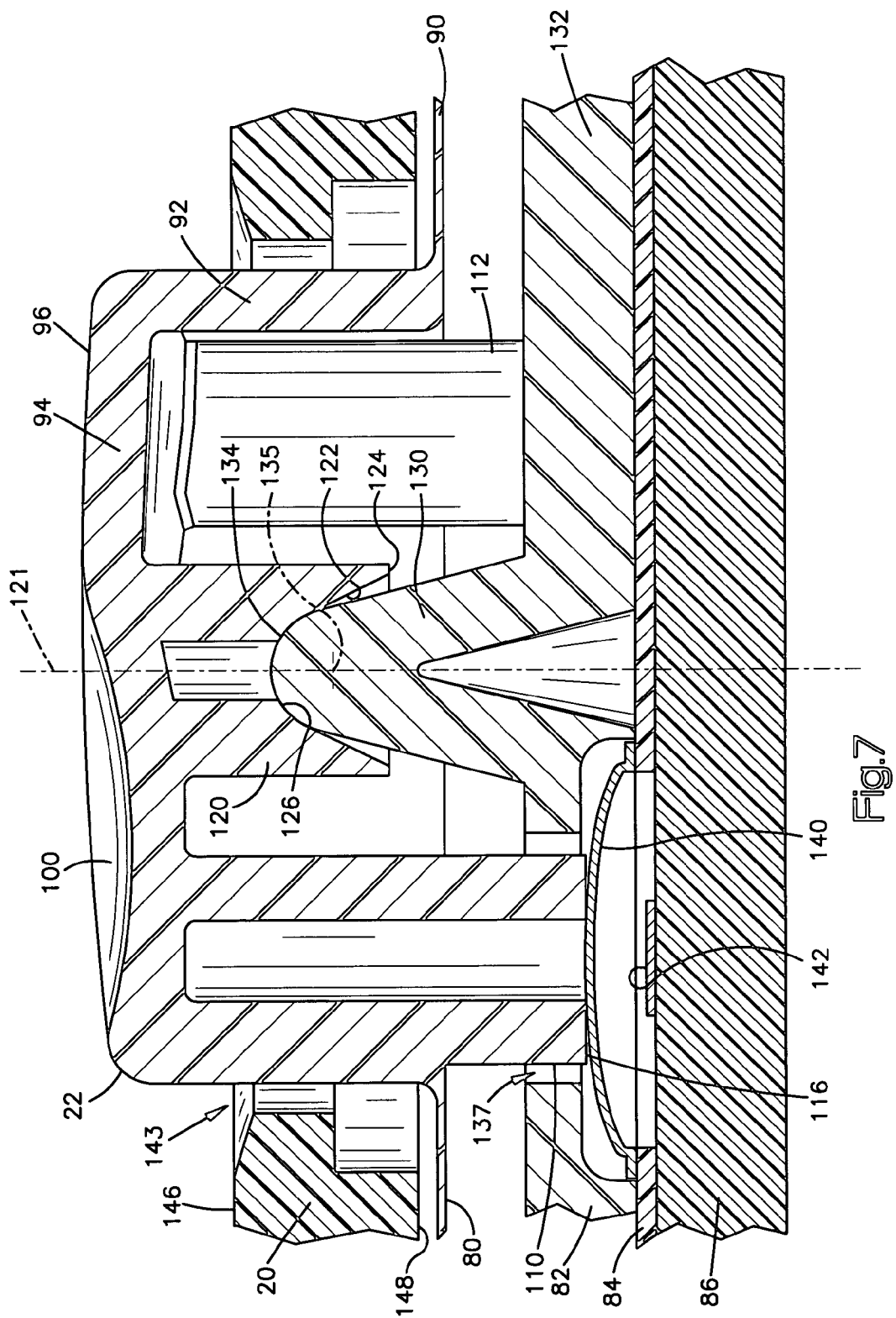
FIG. 7 is a sectional view taken on line 7-7 of FIG. 6.
Figure 8:
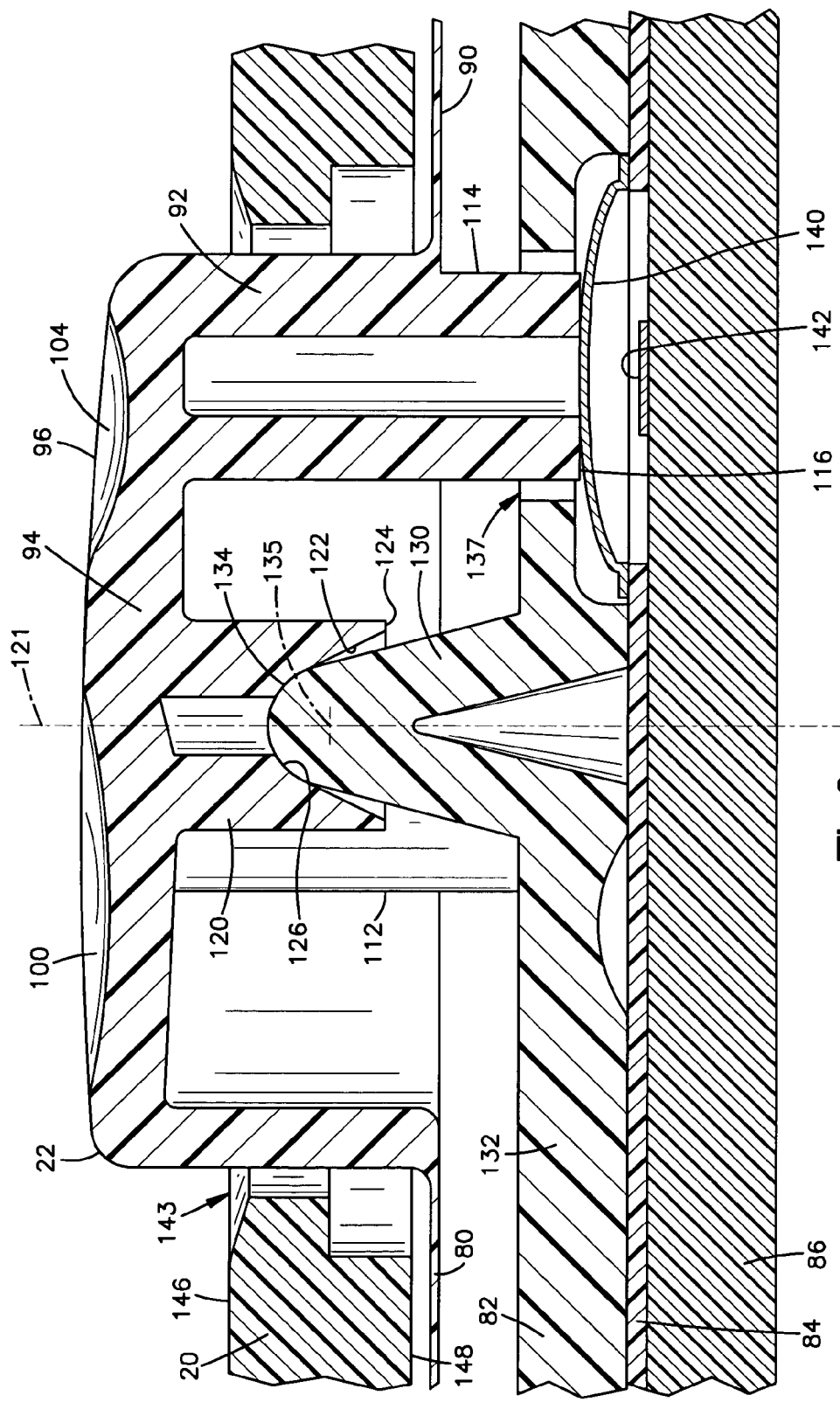
FIG. 8 is a sectional view taken on line 8-8 of FIG. 6.

As further shown in FIGS. 5, 7 and 8, the key 22 has a group of cylindrical plungers 110, 112 and 114. The plungers 110, 112 and 114 have lower ends 116 that are equally spaced vertically downward from the base portion 90 of the molded plastic sheet 80. The three plungers 110, 112 and 114 adjoin the side wall 92 of the key 22, and extend vertically downward from the top wall 94 at locations directly beneath the three actuation surface portions 100, 102 and 104, respectively.

A cylindrical bearing structure 120 also extends vertically downward from the top wall 94 of the key 22. However, the bearing structure 120 does not reach vertically downward to the bottom of the side wall 92, and is centered on a vertical axis 121 at the center of the top wall 94. A concave inner surface 122 of the bearing structure 120 faces axially downward through the open lower end 124 of the bearing structure 120. A portion 126 of the concave inner surface 122 has a spherical contour.

The chassis 82 helps to prevent the user from moving any of keys 22 into more than one actuated position at a time. This example of the chassis 82 is a unitary plastic part that includes a plurality of posts 130 projecting vertically upward from a panel 132. Every post 130 has the same size and shape which, as best shown in FIG. 7, is conical with a spherical upper end surface 134 centered on a pivot point 135. The radius of curvature of the spherical upper end surface 134 is equal to the radius of curvature of the spherical inner surface portion 126 of the bearing structure 120 on the key 22. Any one or more of the posts 130 could function as a light pipe if the chassis 82 were formed of a suitable plastic material and provided with a source of light.

The number and arrangement of the posts 130 on the chassis 82 are the same as the number and arrangement of the bearing structures 120 on the keys 22. Each post 130 is surrounded by a respective group of three apertures 137 that extend through the panel 132. The number and locations of the apertures 137 beside the posts 130 on the chassis 82 are the same as the number and locations of the plungers 110, 112 and 114 beside the bearing structures 120 on the keys 22. In the same arrangement, the dome actuator panel 84 has groups of three dome actuator switches 140 that overlie corresponding groups of three contact structures 142 on the PCB 86. This enables each key 22 on the sheet 80 to fit together with the chassis 82, the dome actuator panel 84 and the PCB 86 in the operatively interconnected relationship shown in the sectional views of FIGS. 7 and 8. At each key 22, the three plungers 110, 112 and 114 then extend through the corresponding group of three apertures 137 in the chassis panel 132. The lower ends 116 of the three plungers 110, 112 and 114 rest on the corresponding group of three dome actuator switches 140. The key 22 projects upward through a bezel opening 143 in the housing panel 20, and the actuation surface 96 at the top of the key 22 is spaced upward from the housing panel 20. The spherical inner surface 122 of the key 22 rests on the spherical upper end surface 134 of the corresponding post 130. Preferably, the pivot point 135 is located vertically between the upper and lower side surfaces 146 and 148 of the housing panel 20.

A user of the mobile device 10 can move the key 22 to an actuated position by manually engaging any one of the actuation surface portions 100, 102 and 104 at the top of the key 22. For example, if the user manually applies a force downward against the key 22 at the major surface portion 100, the panel portion 90 of the plastic sheet 80 will deflect to allow the key 22 to move relative to the other parts shown in FIGS. 7 and 8. The spherical inner surface 126 of the key 22 will then slide on the spherical upper end surface 134 of the post 130 so that the key 22 moves pivotally about the pivot point 135. The first plunger 110, which is located directly beneath the major surface portion 100, then moves downward through its aperture 137 in the chassis panel 132 to deflect the underlying dome actuator switch 140 into engagement with the corresponding contact structure 142 on the PCB 86. This provides the processing device 18 (FIG. 2) with input corresponding to the indicia 24 on the major surface portion 100 of the key 22. The processing device 18 is alternatively provided with input corresponding to the indicia on either of the other two actuation surface portions 102 and 104 by depressing either of those surface portions 102 and 104 to press the respective plunger 112 or 114 against the corresponding switch 140 in the same manner. In each case, the key 22 is returned to the rest position by the return spring action of the switch 140 when the user releases the key 22. When the keyboard 14 is operated in this manner, the chassis 82 helps to prevent the user from moving more than one of the plungers 110, 112 and 114 on a key 22 into actuating contact with the corresponding switches 140 at the same time.

This written description sets forth the best mode of the claimed keyboard apparatus, and describes the claimed keyboard apparatus to enable a person of ordinary skill in the art to make and use it, by presenting examples of the elements recited in the claims. The patentable scope of the keyboard apparatus is defined by the claims, and may include other examples that occur to those skilled in the art. Such other examples, which may be available either before or after the application filing date, are intended to be within the scope of the claims if they have structural elements that do not differ from the literal language of the claims, or if they include equivalent structural elements with insubstantial differences from the literal language of the claims.

What is claimed is:

1. A keyboard apparatus comprising:
    a plurality of keys with each key consisting of only three actuation areas, the three actuation areas being a large actuation area and two smaller actuation areas, each actuation area having corresponding actuation indicia on top of each key and each actuation area having a corresponding plunger on a bottom of each key;
    a chassis structure comprising a plurality of posts, each post projecting upward from the chassis structure and configured to support a corresponding key for pivotal movement about the post into one of three actuated positions with each actuated position corresponding to an actuation area in the event the key is actuated;

a plurality of dome actuated switches, each switch positioned below a corresponding plunger and configured to be actuated in response to the corresponding plunger engaging the switch.

2. The keyboard apparatus of claim 1 wherein a top portion of each post is conically shaped thereby facilitating pivotation of the key upon the post.

3. The keyboard apparatus of claim 1 wherein the chassis structure further comprises a plurality of apertures, each aperture configured to receive a corresponding plunger.

4. The keyboard apparatus of claim 3 wherein the chassis structure is unitary.

5. The keyboard apparatus of claim 1 wherein each dome actuated switch is curved upward toward the plungers when the corresponding key is in a disengaged position thereby forming an arch.

6. The keyboard apparatus of claim 1 further comprising a dome actuator panel with the plurality of dome actuated switches residing on the dome actuator panel.

7. The keyboard apparatus of claim 1 further comprising a printed circuit board having a plurality of switch contacts with each switch contact having a corresponding dome actuated switch.

8. The keyboard apparatus of claim 7 with each dome actuated switch configured to contact a corresponding switch contact when a corresponding key is actuated.

9. The keyboard apparatus of claim 1 further comprising a front panel having a plurality of openings with each opening having a corresponding key and configured to receive the corresponding key in the opening with the key protruding above the front panel.

10. The keyboard apparatus of claim 1 wherein the large actuation area has an oval peripheral shape.

11. A handheld electronic device comprising:
a display; and
a keyboard apparatus comprising:
a plurality of keys with each key consisting of only three actuation areas, the three actuation areas being a large actuation area and two smaller actuation areas, each actuation area having corresponding actuation indicia on top of each key and each actuation area having a corresponding plunger on a bottom of each key;
a chassis structure comprising a plurality of posts, each post projecting upward from the chassis structure and configured to support a corresponding key for pivotal movement about the post into one of three actuated positions with each actuated position corresponding to an actuation area in the event the key is actuated;
a plurality of dome actuated switches, each switch positioned below a corresponding plunger and configured to be actuated in response to the corresponding plunger engaging the switch.

12. The handheld electronic device of claim 11 wherein a top portion of each post is conically shaped thereby facilitating pivotation of the key upon the post.

13. The handheld electronic device of claim 11 wherein the chassis structure further comprises a plurality of apertures, each aperture configured to receive a corresponding plunger.

14. The handheld electronic device of claim 13 wherein the chassis structure is unitary.

15. The handheld electronic device of claim 11 wherein each dome actuated switch is curved upward toward the plungers when the corresponding key is in a disengaged position thereby forming an arch.

16. The handheld electronic device of claim 11 wherein the keyboard apparatus further comprises a dome actuator panel with the plurality of dome actuated switches residing on the dome actuator panel.

17. The handheld electronic device of claim 11 wherein the keyboard apparatus further comprises a printed circuit board having a plurality of switch contacts with each switch contact having a corresponding dome actuated switch.

18. The handheld electronic device of claim 17 with each dome actuated switch configured to contact a corresponding switch contact when a corresponding key is actuated.

19. The handheld electronic device of claim 11 wherein the keyboard apparatus further comprises a front panel having a plurality of openings with each opening having a corresponding key and configured to receive the corresponding key in the opening with the key protruding above the front panel.

20. The handheld electronic device of claim 11 wherein the large actuation area has an oval peripheral shape.

* * * * *